United States Patent
Uchida et al.

(10) Patent No.: US 10,461,792 B2
(45) Date of Patent: Oct. 29, 2019

(54) RADIO COMMUNICATION DEVICE AND RADIO COMMUNICATION SYSTEM

(71) Applicant: Panasonic Intellectual Property Management Co., Ltd., Osaka (JP)

(72) Inventors: Tomohiro Uchida, Kanagawa (JP); Kenji Nishikawa, Hyogo (JP); Toshiharu Ishimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/026,998

(22) Filed: Jul. 3, 2018

(65) Prior Publication Data
US 2018/0331702 A1  Nov. 15, 2018

Related U.S. Application Data

(63) Continuation of application No. PCT/JP2017/000378, filed on Jan. 10, 2017.

(30) Foreign Application Priority Data

Feb. 22, 2016 (JP) .................... 2016-031156

(51) Int. Cl.
*H04B 1/18* (2006.01)
*H04B 1/38* (2015.01)
(Continued)

(52) U.S. Cl.
CPC ............ *H04B 1/18* (2013.01); *H04B 1/00* (2013.01); *H04B 1/38* (2013.01); *H01Q 1/32* (2013.01);
(Continued)

(58) Field of Classification Search
None
See application file for complete search history.

(56) References Cited

U.S. PATENT DOCUMENTS

| | | | |
|---|---|---|---|
| 6,763,254 B2 * | 7/2004 | Nishikawa | H04B 15/04 343/702 |
| 2003/0040206 A1 * | 2/2003 | Wang | G06F 1/1616 439/131 |

(Continued)

FOREIGN PATENT DOCUMENTS

| | | | |
|---|---|---|---|
| JP | 2003-150247 A | 5/2003 | |
| JP | 2004-356798 A | 12/2004 | |

(Continued)

OTHER PUBLICATIONS

International Search Report for corresponding App. No. PCT/JP2017/000378, dated Mar. 21, 2017.

*Primary Examiner* — Lana N Le
(74) *Attorney, Agent, or Firm* — Renner, Otto, Boisselle & Sklar, LLP

(57) ABSTRACT

Tablet PC (10) includes communication units ($11_1$, $11_2$), antenna terminal ($T_1$) used to receive one of first and second signals, antenna terminal ($T_2$) used to receive another one of the first and second signals, terminal switch (40) configured to perform switching between a first coupling state in which communication unit ($11_1$) and terminal ($T_1$) are coupled, and communication unit ($11_2$) and terminal ($T_2$) are coupled, and a second coupling state in which communication unit ($11_1$) and terminal ($T_2$) are coupled, and communication unit ($11_2$) and terminal ($T_1$) are coupled, and controller (30) configured to control terminal switch (40) so as to switch to the first coupling state when terminal ($T_1$) receives the first signal, and terminal ($T_2$) receives the second signal, and to control terminal switch (40) so as to switch to the second coupling state when terminal ($T_1$) receives the second signal, and terminal ($T_2$) receives the first signal.

8 Claims, 11 Drawing Sheets

(51) Int. Cl.
 *H04B 1/00* (2006.01)
 *H01Q 1/32* (2006.01)
 *H04B 1/08* (2006.01)
 *H01Q 21/28* (2006.01)

(52) U.S. Cl.
 CPC .......... *H01Q 1/3275* (2013.01); *H01Q 21/28* (2013.01); *H04B 1/086* (2013.01)

(56) References Cited

U.S. PATENT DOCUMENTS

| | | |
|---|---|---|
| 2004/0242277 A1 | 12/2004 | Kiribayashi |
| 2008/0192806 A1* | 8/2008 | Wyper ................. H04W 88/06 375/133 |
| 2015/0030006 A1* | 1/2015 | Fujio .................... H04B 7/0456 370/336 |
| 2015/0110229 A1* | 4/2015 | Kim ....................... H04B 7/082 375/347 |
| 2015/0215019 A1* | 7/2015 | Bengtsson ........... H04B 7/0404 455/69 |
| 2016/0335980 A1* | 11/2016 | Lee ..................... H04M 1/0243 |
| 2018/0007561 A1* | 1/2018 | Adachi ................. H04W 16/28 |
| 2018/0302138 A1* | 10/2018 | Shirakata ............. H04B 7/0417 |
| 2019/0165843 A1* | 5/2019 | Shang .................. H04B 7/0626 |

FOREIGN PATENT DOCUMENTS

| | | |
|---|---|---|
| JP | 2012-129915 A | 7/2012 |
| JP | 2015-142159 A | 8/2015 |

* cited by examiner

RADIO COMMUNICATION DEVICE AND RADIO COMMUNICATION SYSTEM

BACKGROUND

1. Technical Field

The present disclosure relates to a radio communication device and a radio communication system, which are capable of performing radio communications using external antennas.

2. Description of the Related Art

PTL 1 discloses a radio communication device including an internal antenna provided inside of a housing, and an external antenna provided outside of the housing. The radio communication device measures reception electric field levels (reception sensitivity) of the internal antenna and the external antenna, and switches and selects one of the internal antenna and the external antenna, whichever has a highest reception electric field level.

CITATION LIST

Patent Literature

PTL 1: Unexamined Japanese Patent Publication No. 2004-356798

SUMMARY

A radio communication device according to the present disclosure includes first and second communication units, a first antenna terminal used to receive one of first and second signals, a second antenna terminal used to receive another one of the first and second signals, a terminal switch configured to perform switching between a first coupling state in which the first communication unit and the first antenna terminal are coupled, and the second communication unit and the second antenna terminal are coupled, and a second coupling state in which the first communication unit and the second antenna terminal are coupled, and the second communication unit and the first antenna terminal are coupled, and a controller configured to control the terminal switch so as to switch to the first coupling state when in a first reception state in which the first antenna terminal receives the first signal, and the second antenna terminal receives the second signal, and to control the terminal switch so as to switch to the second coupling state when in a second reception state in which the first antenna terminal receives the second signal, and the second antenna terminal receives the first signal.

DETAILED DESCRIPTION

Figure 1:
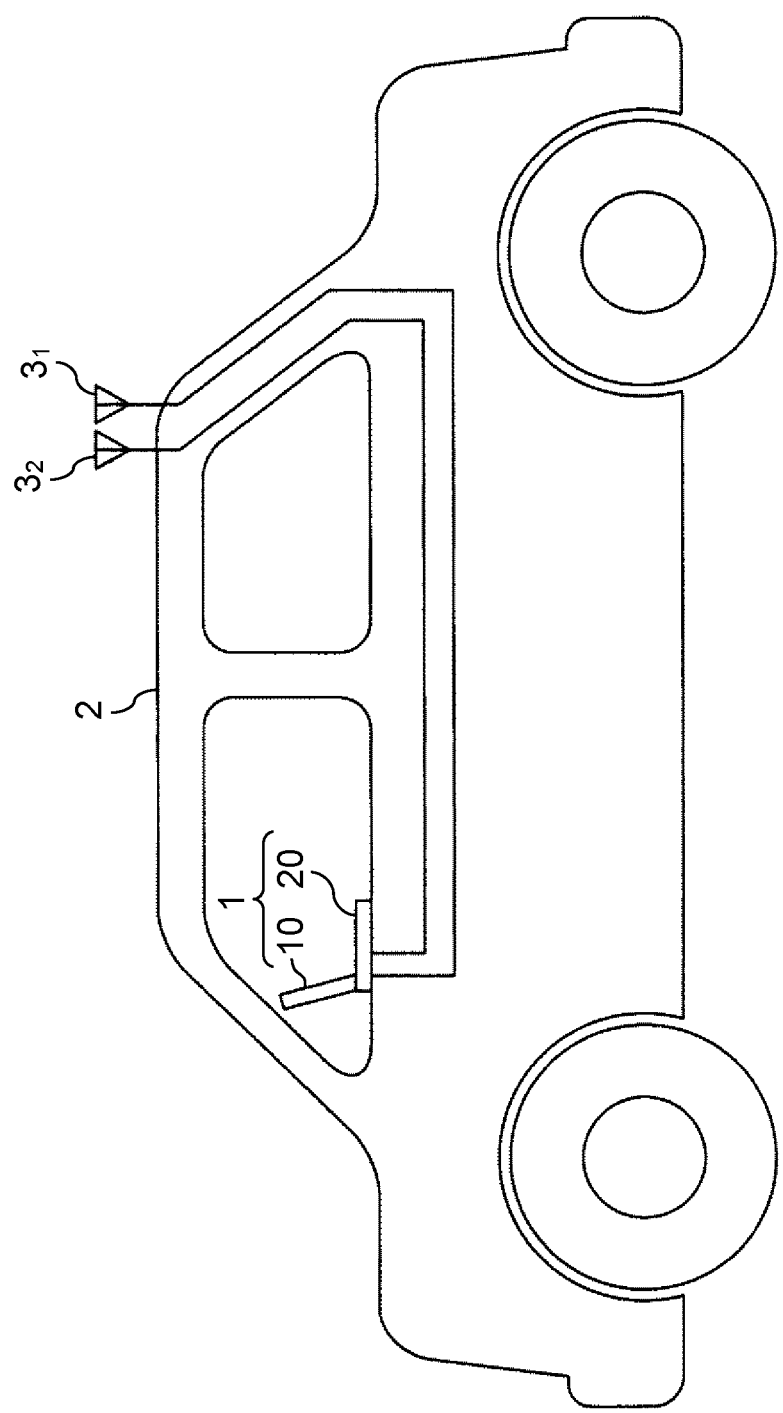
FIG. 1 is a view when information processing device 1 according to a first exemplary embodiment is mounted in vehicle 2 equipped with external antennas $3_1$, $3_2$.

Exemplary embodiments will be described herein in detail with reference to the drawings appropriately. However, detailed descriptions more than necessary might be sometimes omitted. For example, in some cases, detailed description of already well-known items and repeated description with respect to substantially the same configuration will be omitted. These omissions are made to avoid unnecessary redundancy of the following description, and to facilitate the understanding of those skilled in the art. Note that the inventor(s) of the present disclosure provide the accompanying drawings and the following description in order to allow those skilled in the art to fully understand the present disclosure, and do not intend to limit the subject matter as described in the appended claims.

Reasons of why the present disclosure has been invented

A tablet PC described below includes two communication units, i.e., a transmission and reception communication unit (a radio communication module conforming to a communication system such as Bluetooth (registered trademark, the same hereinafter), Wi-Fi (IEEE802.11), third generation mobile communication system (3G), or Long-Term Evolution (LTE)), and a reception exclusive communication unit (a radio communication module conforming to a communication system such as Global Positioning System (GPS)). For the tablet PC, the transmission and reception communication unit needs to be coupled with a transmission and reception antenna, and the reception exclusive communication unit needs to be coupled with a reception exclusive antenna. In addition, in this case, the tablet PC needs to be equipped with two antenna terminals for using two external antennas, i.e., the transmission and reception antenna and the reception exclusive antenna.

The inventors of the present disclosure have assumed that the tablet PC is coupled to a base mounted on a vehicle, for example, and then coupled, via the base, to external antennas mounted on the vehicle.

The inventors of the present disclosure have assumed a system capable of coupling the tablet PC in two different orientations with respect to the base. A problem underlie in the system is that, when the tablet PC is coupled in one of the different orientations with respect to the base, coupling relations of the two antenna terminals to the two external antennas might differ, and thus the relations of the two antenna terminals to two signals to be respectively received by the two external antennas might be reversed. Therefore, the relations of the two communication units to two signals to be received by the two external antennas might also be reversed, and thus signals respectively corresponding to the communication units will no longer be received.

The present disclosure provides a radio communication device including two communication units and two antenna terminals, and a radio communication system, which are capable of receiving signals respectively corresponding to the two communication units, even if two signals to be received by the two antenna terminals are reversed.

First Exemplary Embodiment

As an example radio communication system according to the present disclosure, an information processing device according to a first exemplary embodiment will now be described herein with reference to FIGS. 1 to 8.

1-1. Configuration 1-1-1. Coupling Configuration of External Antennas

FIG. 1 is a view when information processing device 1 according to the first exemplary embodiment is mounted in vehicle 2 equipped with external antennas $3_1$, $3_2$. As shown in FIG. 1, information processing device 1 includes tablet PC (radio communication device) 10, and base 20 mounted with tablet PC 10. Base 20 is mounted on vehicle 2. Base 20 has a rear face coupled with two external antennas $3_1$, $3_2$ mounted on vehicle 2. Tablet PC 10 is coupled to two external antennas $3_1$, $3_2$ via base 20. Information processing device 1 will now be described herein in detail.

1-1-2. Physical Configuration of Information Processing Device

Figure 2:
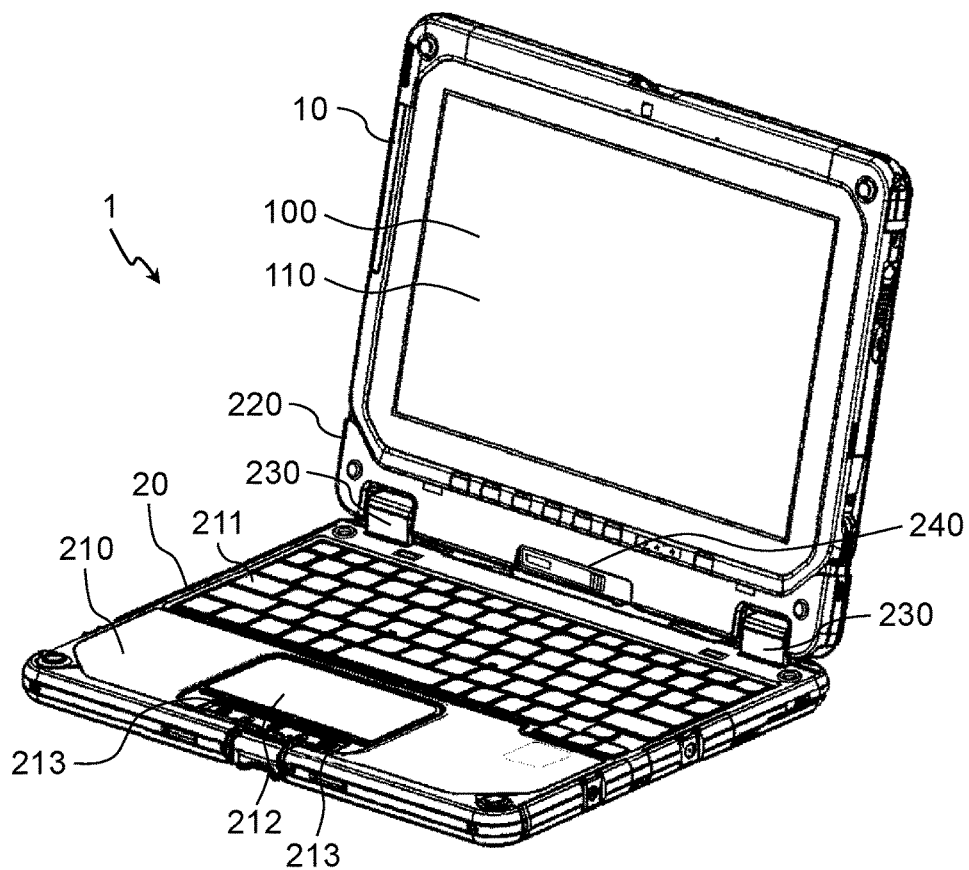
FIG. 2 is an external view of information processing device 1 according to the first exemplary embodiment.

FIG. 2 is an external view of information processing device 1 according to the first exemplary embodiment. As described above, information processing device 1 includes tablet PC 10 and base 20. Tablet PC 10 includes display (display unit) 100 on its front face. Display 100 includes touch panel (operating unit) 110.

Base 20 includes keyboard unit 210 including keyboard 211, touch pad 212, and operation buttons 213, and holder 220 for mounting tablet PC 10. Keyboard unit 210 and holder 220 are coupled by hinges 230. Holder 220 is provided with release lever 240. Release lever 240 is an operating member to be operated to remove tablet PC 10 attached to holder 220 from holder 220. Tablet PC 10 can be removed from holder 220 by sliding release lever 240 to unlock.

Figure 3:
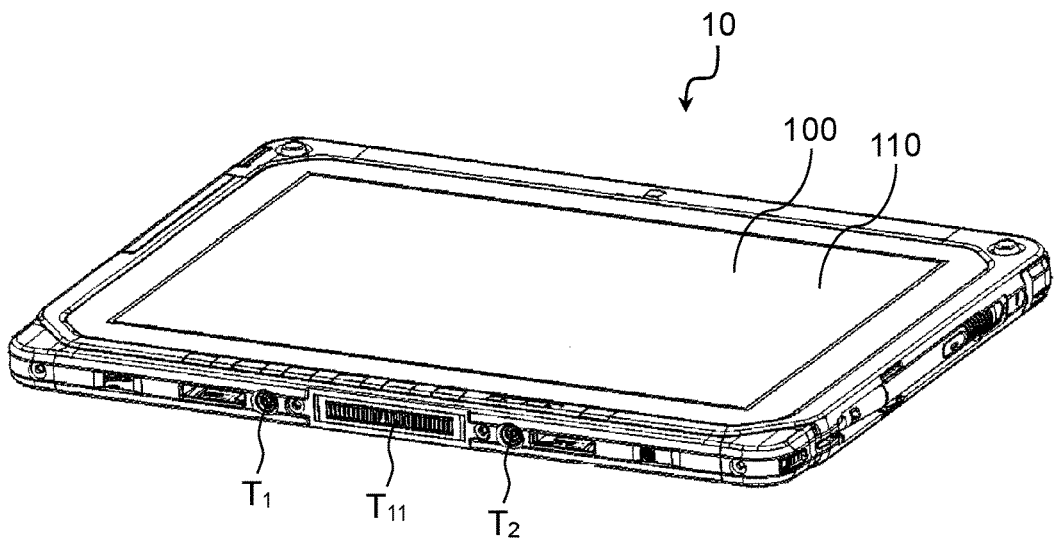
FIG. 3 is a view illustrating a configuration of tablet personal computer (PC) 10 shown in FIG. 2.

FIG. 3 is a view illustrating a configuration of tablet PC 10 shown in FIG. 2. As shown in FIG. 3, tablet PC 10 has a side face provided with first and second antenna terminals $T_1$, $T_2$ and first control terminal $T_{11}$. First and second antenna terminals $T_1$, $T_2$ are symmetrically provided in a left-right direction of tablet PC 10. First control terminal $T_{11}$ is provided at an approximately center in the left-right direction of tablet PC 10 between first and second antenna terminals $T_1$, $T_2$. First and second antenna terminals $T_1$, $T_2$ are coaxial connectors, for example, and first control terminal $T_{11}$ is a connector having 25 pins, for example.

Figure 4:
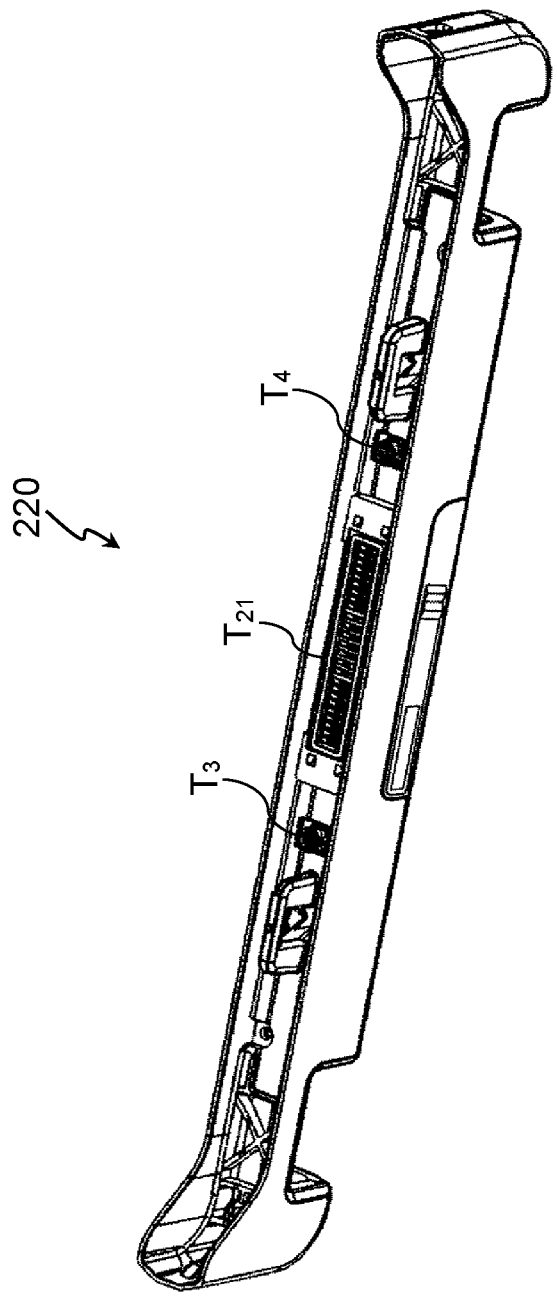
FIG. 4 is a view illustrating a configuration of holder 220 of base 20 shown in FIG. 2.

FIG. 4 is a view illustrating a configuration of holder 220 of base 20 shown in FIG. 2. As shown in FIG. 4, holder 220 of base 20 includes third and fourth antenna terminals $T_3$, $T_4$ and second control terminal $T_{21}$. Third and fourth antenna terminals $T_3$, $T_4$ are symmetrically provided in a left-right direction of holder 220. Second control terminal $T_{21}$ is provided at an approximately center in the left-right direction of holder 220 between third and fourth antenna terminals $T_3$, $T_4$. Third and fourth antenna terminals $T_3$, $T_4$ are coaxial connectors, for example, and second control terminal $T_{21}$ is a connector having 25 pins, for example.

Tablet PC 10 is detachable with respect to base 20. Tablet PC 10 can be separated from base 20 for use as a solo unit (e.g., see FIG. 3). Tablet PC 10 can be mounted on holder 220 of base 20 for use as a laptop PC (e.g., see FIG. 2).

Since tablet PC 10 and base 20 respectively have symmetrical terminal configurations, two mounting states are available when tablet PC 10 is attached to holder 220 of base 20. In a first mounting state, as shown in FIG. 2, tablet PC 10 is attached to holder 220 such that a front of tablet PC 10, in which display 100 and touch panel 110 are provided, faces keyboard unit 210 of base 20. On the other hand, in a second mounting state, tablet PC 10 is attached to holder 220 in a manner reversed (inside out) from the first mounting state.

1-1-3. Electrical Configuration of Information Processing Device

Figure 5:
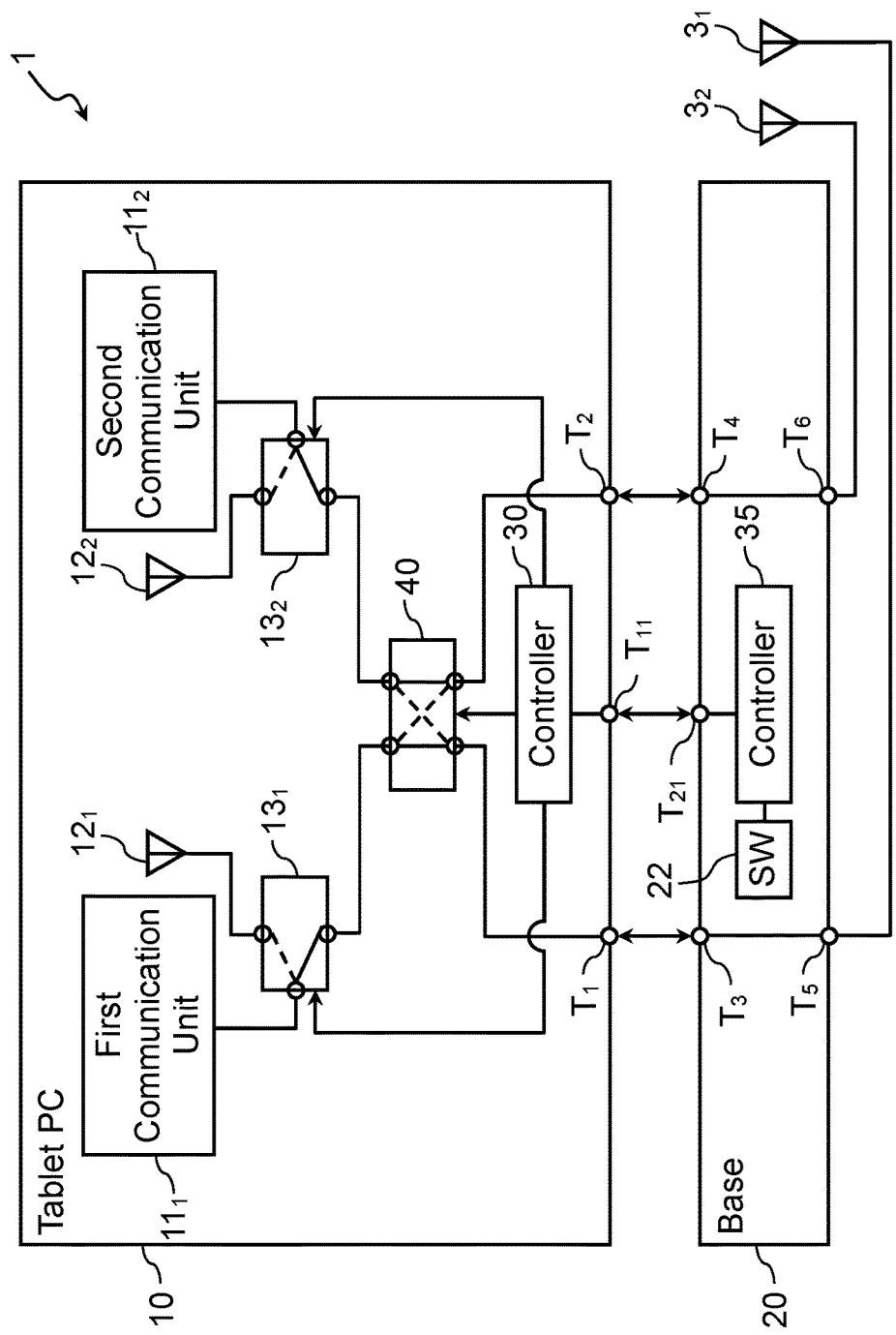
FIG. 5 is a block diagram illustrating an electrical configuration in a first mounting state of information processing device 1 according to the first exemplary embodiment.
Figure 6:
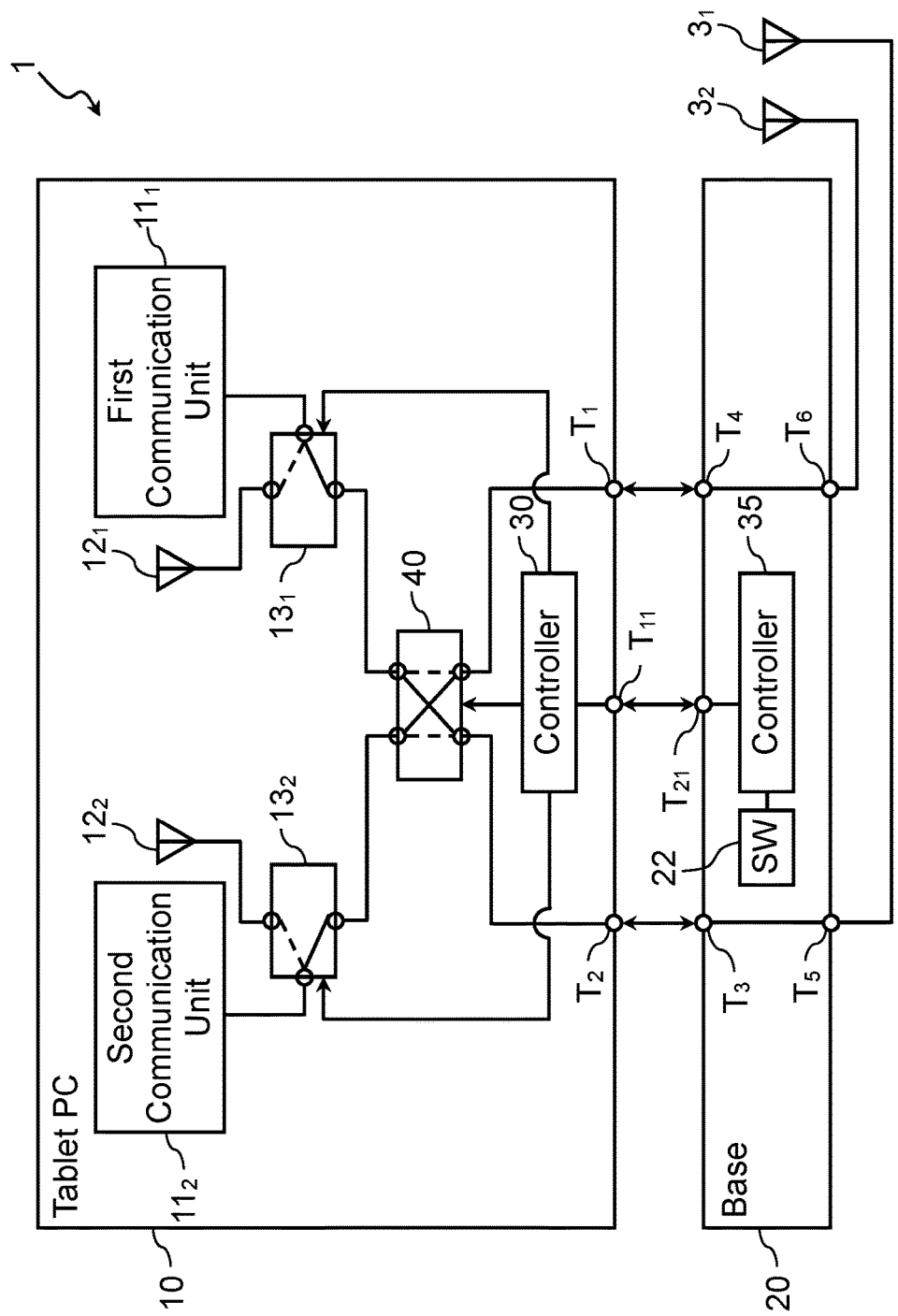
FIG. 6 is a block diagram illustrating an electrical configuration in a second mounting state of information processing device 1 according to the first exemplary embodiment.

FIG. 5 is a block diagram illustrating an electrical configuration in the first mounting state of information processing device 1 according to the first exemplary embodiment. FIG. 6 is a block diagram illustrating an electrical configuration in the second mounting state of information processing device 1 according to the first exemplary embodiment.

As shown in FIG. 5, in the first mounting state, first antenna terminal $T_1$ of tablet PC 10 is coupled to third antenna terminal $T_3$ of base 20, and second antenna terminal $T_2$ of tablet PC 10 is coupled to fourth antenna terminal $T_4$ of base 20. On the other hand, as shown in FIG. 6, in the second mounting state, first antenna terminal $T_1$ of tablet PC 10 is coupled to fourth antenna terminal $T_4$ of base 20, and second antenna terminal $T_2$ of tablet PC 10 is coupled to third antenna terminal $T_3$ of base 20. In both of the first and second mounting states, first control terminal $T_{11}$ of tablet PC 10 is coupled to second control terminal $T_{21}$ of base 20.

Tablet PC 10 includes, in addition to first and second antenna terminals $T_1$, $T_2$ and first control terminal $T_{11}$, first and second communication units $11_1$, $11_2$, first and second internal antennas $12_1$, $12_2$, first and second antenna switches $13_1$, $13_2$, controller 30, and terminal switch 40.

First communication unit $11_1$ is a communication module for transmitting and receiving (or receiving only) configured to perform communications conforming to a communication system such as Bluetooth, Wi-Fi, 3G, or LTE. Second communication unit $11_2$ is a reception exclusive communication module configured to perform communications conforming to GPS, for example. First communication unit $11_1$ and second communication unit $11_2$ may be formed in a single communication module.

First internal antenna $12_1$ is a transmission and reception antenna conforming to a communication system such as Bluetooth, Wi-Fi, 3G, or LTE. Second internal antenna $12_2$ is a reception exclusive antenna used to perform communications conforming to GPS, for example.

First antenna switch $13_1$ follows an antenna switch signal (details will be described later) received from base 20 to switch a coupling between first communication unit $11_1$ and first internal antenna $12_1$ or terminal switch 40 (i.e., first external antenna $3_1$). Second antenna switch $13_2$ follows an antenna switch signal received from base 20 to switch a coupling between second communication unit $11_2$ and second internal antenna $12_2$ or terminal switch 40 (i.e., second external antenna $3_2$).

Controller 30 is coupled to first control terminal $T_{11}$. Controller 30 cooperates with first control terminal $T_{11}$, and controller 35 and second control terminal $T_{21}$ in base 20 to function as a detector configured to detect how tablet PC 10 is mounted on base 20. Controller 30 outputs a terminal switch signal indicative of how tablet PC 10 is mounted with respect to base 20. For example, the terminal switch signal is set to "high" in the first mounting state, and is set to "low" in the second mounting state.

Terminal switch 40 follows the terminal switch signal transmitted from controller 30 to perform switching between a first coupling state in which first antenna switch $13_1$ (i.e., first communication unit $11_1$) and first antenna terminal $T_1$ are coupled, and second antenna switch $13_2$ (i.e., second communication unit $11_2$) and second antenna terminal $T_2$ are coupled, and a second coupling state in which first antenna switch $13_1$ (i.e., first communication unit $11_1$) and second antenna terminal $T_2$ are coupled, and second antenna switch $13_2$ (i.e., second communication unit $11_2$) and first antenna terminal $T_1$ are coupled.

In the first mounting state shown in FIG. 5, terminal switch 40 performs switching based on a terminal switch signal at the "high" level transmitted from controller 30 such that first antenna switch $13_1$ is coupled to first antenna terminal $T_1$, and second antenna switch $13_2$ is coupled to second antenna terminal $T_2$. On the other hand, in the second mounting state shown in FIG. 6, terminal switch 40 performs switching based on a terminal switch signal at the "low" level transmitted from controller 30 such that first antenna switch $13_1$ is coupled to second antenna terminal $T_2$, and second antenna switch $13_2$ is coupled to first antenna terminal $T_1$.

Base 20 includes, in addition to third and fourth antenna terminals $T_3$, $T_4$ and second control terminal $T_{21}$, fifth and sixth antenna terminals $T_5$, $T_6$, switch 22, and controller 35.

Fifth and sixth antenna terminals $T_5$, $T_6$ are disposed on the rear face of base 20. Fifth antenna terminal $T_5$ is coupled to third antenna terminal $T_3$ and first external antenna $3_1$. Sixth antenna terminal $T_6$ is coupled to fourth antenna terminal $T_4$ and second external antenna $3_2$.

Therefore, in the first mounting state shown in FIG. 5, first antenna terminal $T_1$ of tablet PC 10 receives a first signal via first external antenna $3_1$, and second antenna terminal $T_2$ of tablet PC 10 receives a second signal via second external antenna $3_2$ (first reception state). On the other hand, in the second mounting state shown in FIG. 6, first antenna terminal $T_1$ of tablet PC 10 receives the second signal via second external antenna $3_2$, and second antenna terminal $T_2$ of tablet PC 10 receives the first signal via first external antenna $3_1$ (second reception state).

The first signal is a signal conforming to a communication system such as Bluetooth, Wi-Fi, 3G, or LTE, and first external antenna $3_1$ is a transmission and reception antenna used to perform communications conforming to a communication system such as Bluetooth, Wi-Fi, 3G, or LTE. The second signal is a signal conforming to a communication system such as GPS, and second external antenna $3_2$ is a reception exclusive antenna used to perform communications conforming to GPS, for example.

Switch 22 is a switch used by a user to specify whether first and second internal antennas $12_1$, $12_2$ are used or first and second external antennas $3_1$, $3_2$ are used on tablet PC 10. Switch 22 is a mechanical switch provided to base 20, and is manually operated by the user, for example. Switch 22 transmits to tablet PC 10 an antenna switch signal indicative of a state of switch 22. The antenna switch signal is set to "high" when internal antennas are set to be used, using switch 22, and is set to "low" when external antennas are set to be used.

Controller 35 is coupled to switch 22 and second control terminal $T_{21}$. Controller 35 cooperates with second control terminal $T_{21}$, and controller 30 and first control terminal $T_{11}$ in tablet PC 10 to function as a detector configured to detect how tablet PC 10 is mounted on base 20.

1-2. Operation

Operation of information processing device 1 and tablet PC 10 configured as described above will now be described herein.

Figure 7:
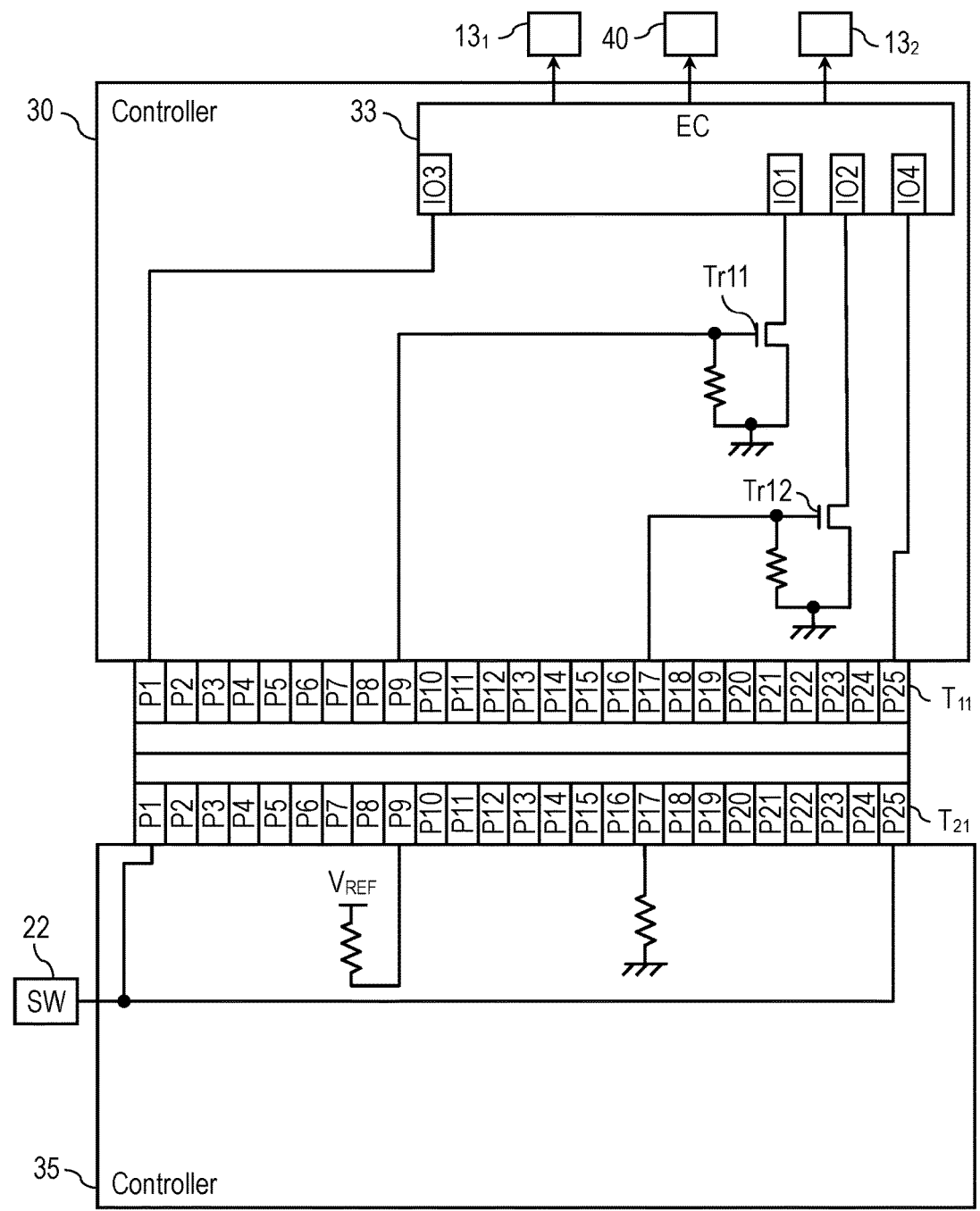
FIG. 7 is a view illustrating electrical couplings between controllers 30, 35 in the first mounting state.
Figure 8:
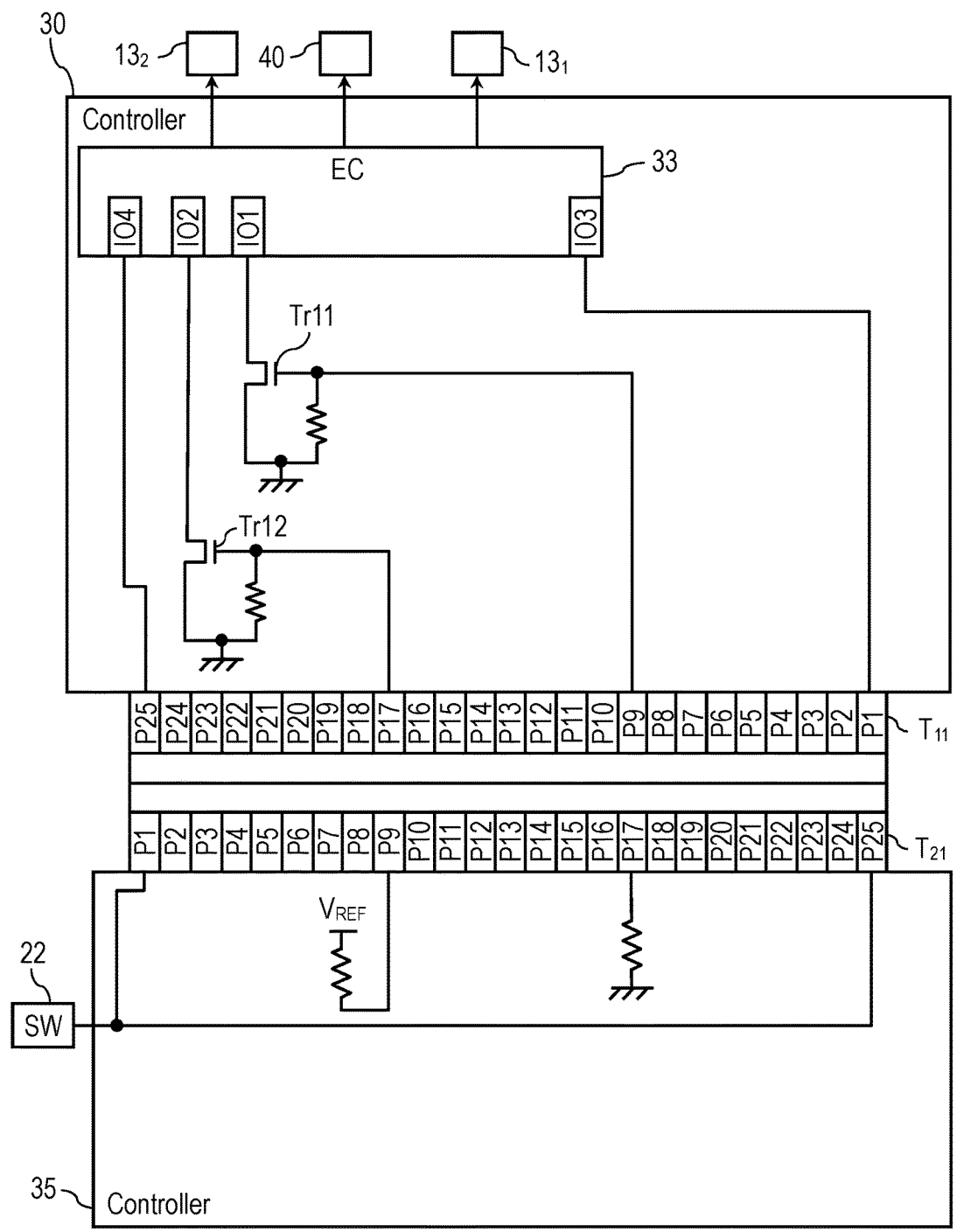
FIG. 8 is a view illustrating electrical couplings between controllers 30, 35 in the second mounting state.

First, how controllers 30, 35 and first and second control terminals $T_{11}$, $T_{21}$ detect the first mounting state of tablet PC 10 with respect to base 20 and the second mounting state reversed from the first mounting state will now be described herein. FIG. 7 is a view illustrating electrical couplings between controllers 30, 35 in the first mounting state. FIG. 8 is a view illustrating electrical couplings between controllers 30, 35 in the second mounting state.

As shown in FIG. 7, in the first mounting state, pins P1 to P25 of first control terminal $T_{11}$ are respectively coupled to pins P1 to P25 of second control terminal $T_{21}$. On the other hand, as shown in FIG. 8, in the second coupling state, pins P1 to P25 of first control terminal $T_{11}$ are respectively coupled to pins P25 to P1 of second control terminal $T_{21}$.

Controller 30 of tablet PC 10 includes embedded computer (EC) 33 served as a control circuit, and P-channel transistors Tr11, Tr12.

Pins IO1, IO2 of EC 33 are terminals used to detect how tablet PC 10 is mounted on base 20. Pin IO1 of EC 33 is coupled to a source terminal of transistor Tr11, and a drain terminal of transistor Tr11 is grounded. A gate terminal of transistor Tr11 is coupled to pin P9 of first control terminal $T_{11}$, and is grounded via a resistance element. On the other hand, pin IO2 of EC 33 is coupled to a source terminal of transistor Tr12, and a drain terminal of transistor Tr12 is grounded. A gate terminal of transistor Tr12 is coupled to pin P17 of first control terminal $T_{11}$, and is grounded via a resistance element.

In the first mounting state, as shown in FIG. 7, reference voltage $V_{REF}$ is input from controller 35 of base 20, via pin P9, into the gate terminal of transistor Tr11, and thus transistor Tr11 is turned off. Therefore, pin IO1 of EC 33 is open. On the other hand, the gate terminal of transistor Tr12 is coupled to a ground potential via pin P17, and thus transistor Tr12 is turned on. Therefore, pin IO2 of EC 33 is at a "low" level. As described above, when pin IO1 is open, and pin IO2 is at the low level, EC 33 detects the first mounting state, and transmits to terminal switch 40 the terminal switch signal at the "high" level indicative of the first mounting state.

On the other hand, in the second coupling state, as shown in FIG. 8, the gate terminal of transistor Tr11 is coupled to the ground potential via pins P9 and P17, and thus transistor Tr11 is turned on. Therefore, pin IO1 of EC 33 is at a "low" level. On the other hand, reference voltage $V_{REF}$ is input from controller 35 of base 20, via pins P17 and P9, into the gate terminal of transistor Tr12, and thus transistor Tr12 is turned off. Therefore, pin IO2 of EC 33 is open. As described above, when pin IO1 is at the low level, and pin IO2 is open, EC 33 detects the second mounting state, and transmits to terminal switch 40 the terminal switch signal at the "low" level indicative of the second mounting state.

Pins IO3, IO4 of EC 33 are terminals used to receive antenna switch signals from switch 22. Pins IO3, IO4 are coupled to switch 22. In both of the first and second mounting states, EC 33 receives the antenna switch signal from switch 22 via pin IO3 or IO4.

Pins IO3, IO4 of EC 33 also detect that tablet PC 10 is solely used. When pins IO3, IO4 of EC 33 are open, EC 33 detects that tablet PC 10 is removed from base 20, and pins P1, P25 of first control terminal $T_{11}$ are open, and transmits an antenna switch signal at the "high" level to first and second antenna switches $13_1$, $13_2$.

1-2-1. Solo Unit State

When tablet PC 10 is solely used, as shown in FIG. 3, pins P1, P25 of first control terminal $T_{11}$ and pins IO3, IO4 of EC 33 of controller 30 shown in FIG. 7 are open. At this time, EC 33 controls first antenna switch $13_1$ such that first communication unit $11_1$ is coupled to first internal antenna $12_1$. Simultaneously, EC 33 controls second antenna switch $13_2$ such that second communication unit $11_2$ is coupled to second internal antenna $12_2$ (shown with broken lines in first and second antenna switches $13_1$, $13_2$ in FIG. 5).

Therefore, first communication unit $11_1$ can use first internal antenna $12_1$ to perform communications, and second communication unit $11_2$ can use second internal antenna $12_2$ to perform communications.

1-2-2. First Mounting State

As shown in FIGS. 2 and 5, when tablet PC 10 is attached to holder 220 of base 20 in the first mounting state, first antenna terminal $T_1$ of tablet PC 10 is coupled to third antenna terminal $T_3$ of base 20, and second antenna terminal $T_2$ is coupled to fourth antenna terminal $T_4$ of base 20. At this time, as shown in FIG. 7, pins P1 to P25 of first control terminal $T_{11}$ are respectively coupled to pins P1 to P25 of second control terminal $T_{21}$.

As shown in FIG. 7, the gate terminal of transistor Tr12 of controller 30 is grounded, transistor Tr12 is turned on, and pin IO2 of EC 33 is at "low." Simultaneously, reference voltage $V_{REF}$ is input into the gate terminal of transistor Tr11, transistor Tr11 is turned off, and pin IO1 of EC 33 is open. Upon the first mounting state is detected, EC 33 of controller 30 transmits to terminal switch 40 the terminal switch signal at the "high" level to control terminal switch 40 such that, as shown in FIG. 5, first antenna switch $13_1$ (i.e., first communication unit $11_1$) is coupled to first antenna terminal $T_1$, and second antenna switch $13_2$ (i.e., second communication unit $11_2$) is coupled to second antenna terminal $T_2$.

Therefore, first communication unit $11_1$ can use first external antenna $3_1$ to perform communications, and second communication unit $11_2$ can use second external antenna $3_2$ to perform communications.

When tablet PC 10 is mounted on base 20 for use in a vehicle, communications using first and second internal antennas $12_1$, $12_2$ become difficult because the vehicle is internally shielded. In this case, a user operates switch 22 such that first and second external antennas $3_1$, $3_2$ are available. Therefore, the antenna switch signal at "low" is transmitted from switch 22, and is input into pins IO3, IO4 of EC 33 of controller 30. Therefore, EC 33 transmits the antenna switch signal at the "low level" to first antenna switch $13_1$ to control first antenna switch $13_1$ such that first communication unit $11_1$ is coupled to terminal switch 40 (i.e., first external antenna $3_1$). Simultaneously, EC 33 transmits the antenna switch signal at the "low level" to second antenna switch $13_2$ to control second antenna switch $13_2$ such that second communication unit $11_2$ is coupled to terminal switch 40 (i.e., second external antenna $3_2$) (shown with solid lines in first and second antenna switches $13_1$, $13_2$ in FIG. 5).

When the user operates switch 22 such that first and second internal antennas $12_1$, $12_2$ are available, the antenna switch signal at "high" is transmitted from switch 22. Therefore, the signal at the high level is input into pins IO3, IO4 of EC 33 of controller 30. Therefore, EC 33 transmits the antenna switch signal at the "high level" to first antenna switch $13_1$ to control first antenna switch $13_1$ such that first communication unit $11_1$ is coupled to first internal antenna $12_1$. Simultaneously, EC 33 transmits the antenna switch signal at the "high level" to second antenna switch $13_2$ to control second antenna switch $13_2$ such that second communication unit $11_2$ is coupled to second internal antenna $12_2$ (shown with dotted lines in first and second antenna switches $13_1$, $13_2$ in FIG. 5).

Therefore, first communication unit $11_1$ can use one of first external antenna $3_1$ and first internal antenna $12_1$ to perform communications, and second communication unit $11_2$ can use one of second external antenna $3_2$ and second internal antenna $12_2$ to perform communications.

1-2-3. Second Mounting State

As shown in FIG. 6, when tablet PC 10 is attached to holder 220 of base 20 in the second mounting state, first antenna terminal $T_1$ of tablet PC 10 is coupled to fourth antenna terminal $T_4$ of base 20, and second antenna terminal $T_2$ is coupled to third antenna terminal $T_3$ of base 20. At this time, as shown in FIG. 8, pins P1 to P25 of first control terminal $T_{11}$ are respectively coupled to pins P25 to P1 of second control terminal $T_{21}$.

At this time, the gate terminal of transistor Tr11 of controller 30 is grounded, transistor Tr11 is turned on, and pin IO1 of EC 33 is at the "low" level. Simultaneously, reference voltage $V_{REF}$ is input into the gate terminal of transistor Tr12, transistor Tr12 is turned off, and pin IO2 of EC 33 is open. Upon the second coupling state is detected, EC 33 of controller 30 transmits to terminal switch 40 the terminal switch signal at the "low" level to control terminal switch 40 such that, as shown in FIG. 6, first antenna switch $13_1$ (i.e., first communication unit $11_1$) is coupled to second antenna terminal $T_2$, and second antenna switch $13_2$ (i.e., second communication unit $11_2$) is coupled to first antenna terminal $T_1$.

Therefore, even in the second mounting state, similar to the first mounting state, first communication unit $11_1$ can use first external antenna $3_1$ to perform communications, and second communication unit $11_2$ can use second external antenna $3_2$ to perform communications.

1-3. Effects and Other Benefits

As described above, in this exemplary embodiment, tablet PC (radio communication device) 10 includes first and second communication units $11_1$, $11_2$, first and second antenna terminals $T_1$, $T_2$, terminal switch 40, and controller 30. First antenna terminal $T_1$ receives one of first and second signals, and second antenna terminal $T_2$ receives another one of the first and second signals. Terminal switch 40 performs switching between a first coupling state in which first communication unit $11_1$ and first antenna terminal $T_1$ are coupled, and second communication unit $11_2$ and second antenna terminal $T_2$ are coupled, and a second coupling state in which first communication unit $11_1$ and second terminal $T_2$ are coupled, and second communication unit $11_2$ and first antenna terminal $T_1$ are coupled. Controller 30 controls terminal switch 40 to switch to the first coupling state when in the first reception state in which first antenna terminal $T_1$ receives the first signal, and second antenna terminal $T_2$ receives the second signal, and to switch to the second coupling state when in the second reception state in which first antenna terminal $T_1$ receives the second signal, and second antenna terminal $T_2$ receives the first signal.

In this exemplary embodiment, information processing device (radio communication system) 1 includes, as described above, tablet PC (radio communication device) 10 and base 20. Base 20 allows tablet PC 10 to be detachably mounted, and includes third antenna terminal $T_3$ used to output the first signal, and fourth antenna terminal $T_4$ used to output the second signal. In the above-described first reception state, tablet PC 10 is mounted on base 20 such that first antenna terminal $T_1$ is coupled to third antenna terminal $T_3$, and second antenna terminal $T_2$ is coupled to fourth antenna terminal $T_4$ (first mounting state). In the above-described second reception state, tablet PC 10 is mounted on base 20 such that first antenna terminal $T_1$ is coupled to fourth antenna terminal $T_4$, and second antenna terminal $T_2$ is coupled to third antenna terminal $T_3$ (second mounting state).

Therefore, even when tablet PC (radio communication device) 10 is attached to base 20 in the second mounting state reversed from the first mounting state (rotated by 180°), and signals to be received by first antenna terminal $T_1$ and second antenna terminal $T_2$ are reversed, a relation between first communication unit $11_1$ and the first signal and a relation between second communication unit $11_2$ and the second signal are maintained, similar to the case when tablet PC 10 is attached to base 20 in the first mounting state.

In other words, even when couplings of first and second antenna terminals $T_1$, $T_2$ to first and second external antennas $3_1$, $3_2$ are reversed, a coupling relation between first communication unit $11_1$ and first external antenna $3_1$ and a coupling relation between second communication unit $11_2$ and second external antenna $3_2$ are maintained.

Second Exemplary Embodiment

The first exemplary embodiment has described the configuration in which tablet PC 10 includes terminal switch 40. In contrast, a second exemplary embodiment describes a configuration in which a base includes a terminal switch. The second exemplary embodiment will now be described herein with reference to FIGS. 9 to 12.

Figure 9:
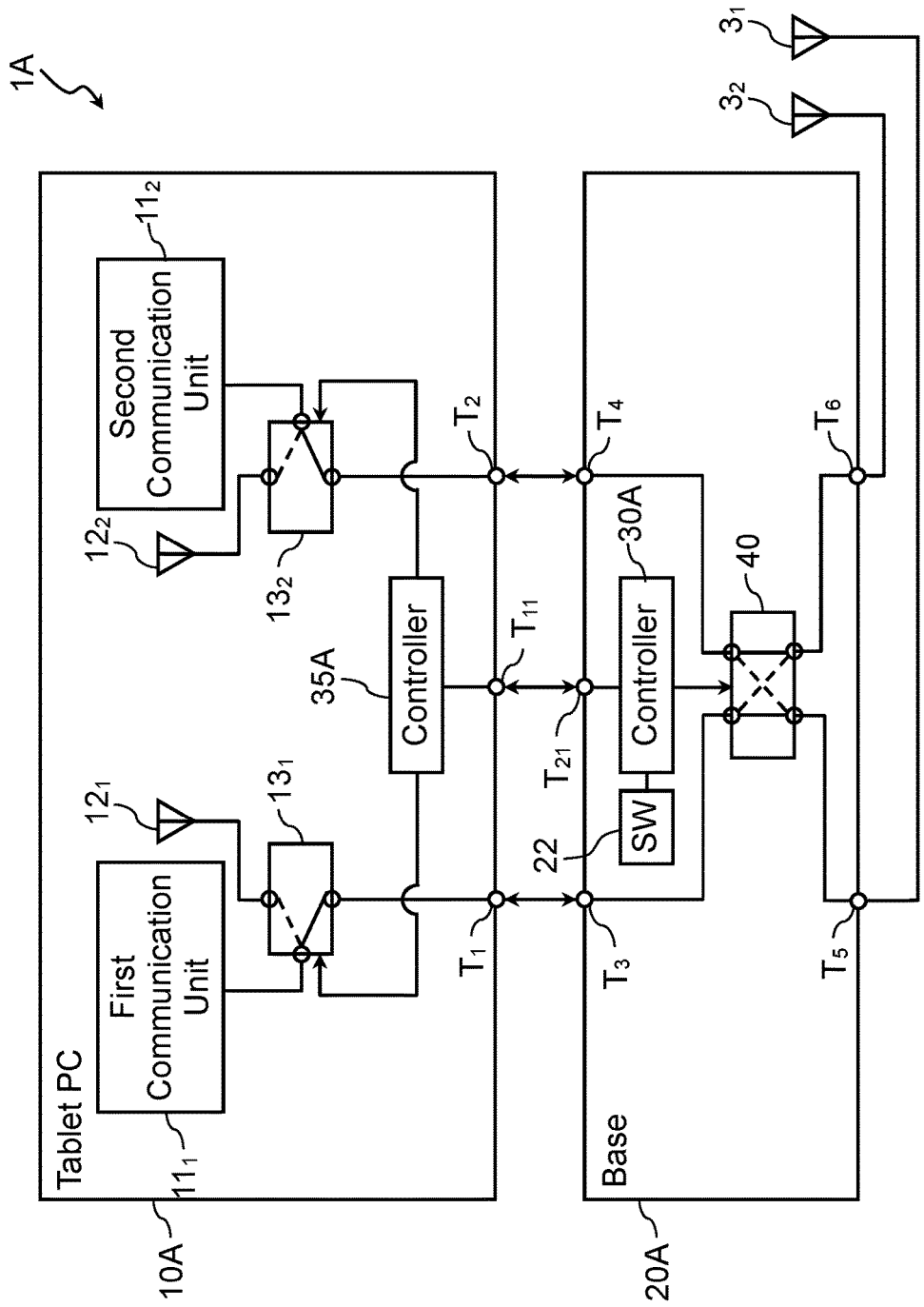
FIG. 9 is a block diagram illustrating an electrical configuration in a first mounting state of information processing device 1A according to a second exemplary embodiment.
Figure 10:
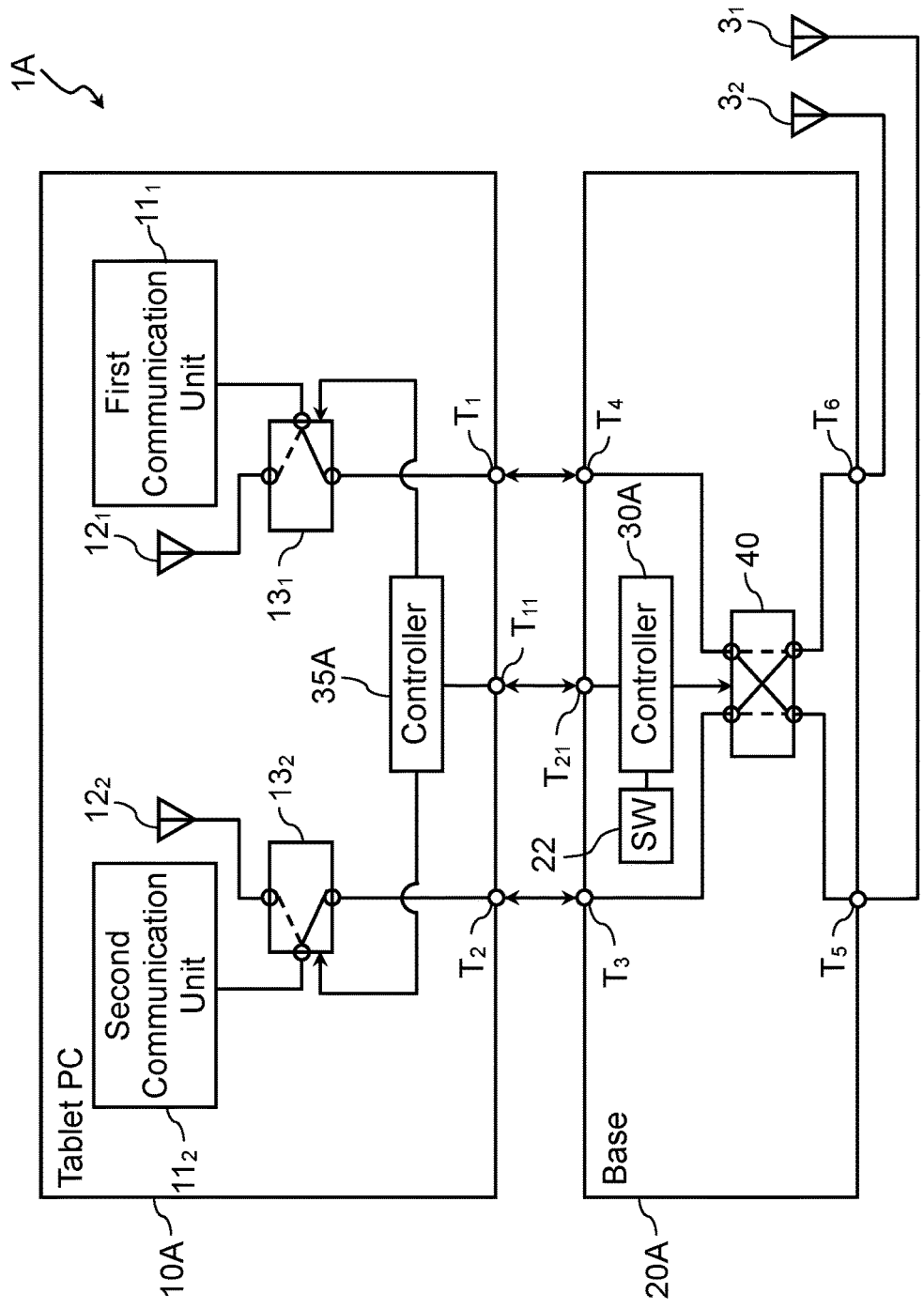
FIG. 10 is a block diagram illustrating an electrical configuration in a second mounting state of information processing device 1A according to the second exemplary embodiment.

FIG. 9 is a block diagram illustrating an electrical configuration in a first mounting state of information processing device 1A according to the second exemplary embodiment. FIG. 10 is a block diagram illustrating an electrical configuration in a second mounting state of information processing device 1A according to the second exemplary embodiment. Information processing device 1A includes tablet PC 10A and base 20A.

Tablet PC 10A according to the second exemplary embodiment differs from tablet PC 10 according to the first exemplary embodiment in terms of that terminal switch 40 is not included, first antenna switch $13_1$ for first communication unit $11_1$ is always coupled to first antenna terminal $T_1$, and second antenna switch $13_2$ for second communication unit $11_2$ is always coupled to second antenna terminal $T_2$.

Tablet PC 10A according to the second exemplary embodiment includes controller 35A. Controller 35A is coupled to first control terminal $T_{11}$. Controller 35A cooperates with first control terminal $T_{11}$, and controller 30A and second control terminal $T_{21}$ in base 20A to function as a detector configured to detect how tablet PC 10A is mounted on base 20A.

Base 20A according to the second exemplary embodiment differs from base 20 according to the first exemplary embodiment in terms of that terminal switch 40 is further included. Terminal switch 40 follows a terminal switch signal transmitted from controller 30A to perform switching between a first coupling state in which third antenna terminal $T_3$ and fifth antenna terminal $T_5$ (i.e., first external antenna $3_1$) are coupled, and fourth antenna terminal $T_4$ and sixth antenna terminal $T_6$ (i.e., second external antenna $3_2$) are coupled, and a second coupling state in which third antenna terminal $T_3$ and sixth antenna terminal $T_6$ (i.e., second external antenna $3_2$) are coupled, and fourth antenna terminal $T_4$ and fifth antenna terminal $T_5$ (i.e., first external antenna $3_1$) are coupled.

Controller 30A of base 20A includes EC 33 and P-channel transistors Tr11, Tr12.

Pins IO1, IO2 of EC 33 are terminals used to detect how tablet PC 10A is mounted on base 20A. Pin IO1 is coupled to a source terminal of transistor Tr11. A drain terminal of transistor Tr11 is grounded. A gate terminal of transistor Tr11 is coupled to pin P9 of second control terminal $T_{21}$, and is grounded via a resistance element. On the other hand, pin IO2 is coupled to a source terminal of transistor Tr12. A drain terminal of transistor Tr12 is grounded. A gate terminal of transistor Tr12 is coupled to pin P17 of second control terminal $T_{21}$, and is grounded via a resistance element.

Controller 35A of tablet PC 10A includes EC 36. Pins IO3, IO4 of EC 36 are terminals used to detect a state of switch 22. Pins IO3, IO4 of EC 36 are coupled to switch 22. In both of the first and second mounting states, EC 36 receives an antenna switch signal from switch 22 via pin IO3 or IO4.

In the first mounting state shown in FIG. 9, controller 30A outputs a terminal switch signal at a "high" level. Terminal switch 40 follows the terminal switch signal to couple third antenna terminal $T_3$ to fifth antenna terminal $T_5$, and to couple fourth antenna terminal $T_4$ to sixth antenna terminal $T_6$. On the other hand, in the second mounting state shown in FIG. 10, controller 30A outputs a terminal switch signal at a "low" level. Terminal switch 40 follows the terminal switch signal to couple third antenna terminal $T_3$ to sixth antenna terminal $T_6$, and to couple fourth antenna terminal $T_4$ to fifth antenna terminal $T_5$.

Controller 30A of base 20A is coupled to switch 22 and second control terminal $T_{21}$. Controller 30A cooperates with second control terminal $T_{21}$, and controller 35A and first control terminal $T_{11}$ in tablet PC 10A to function as a detector configured to detect how tablet PC 10A is mounted on base 20A.

Figure 11:
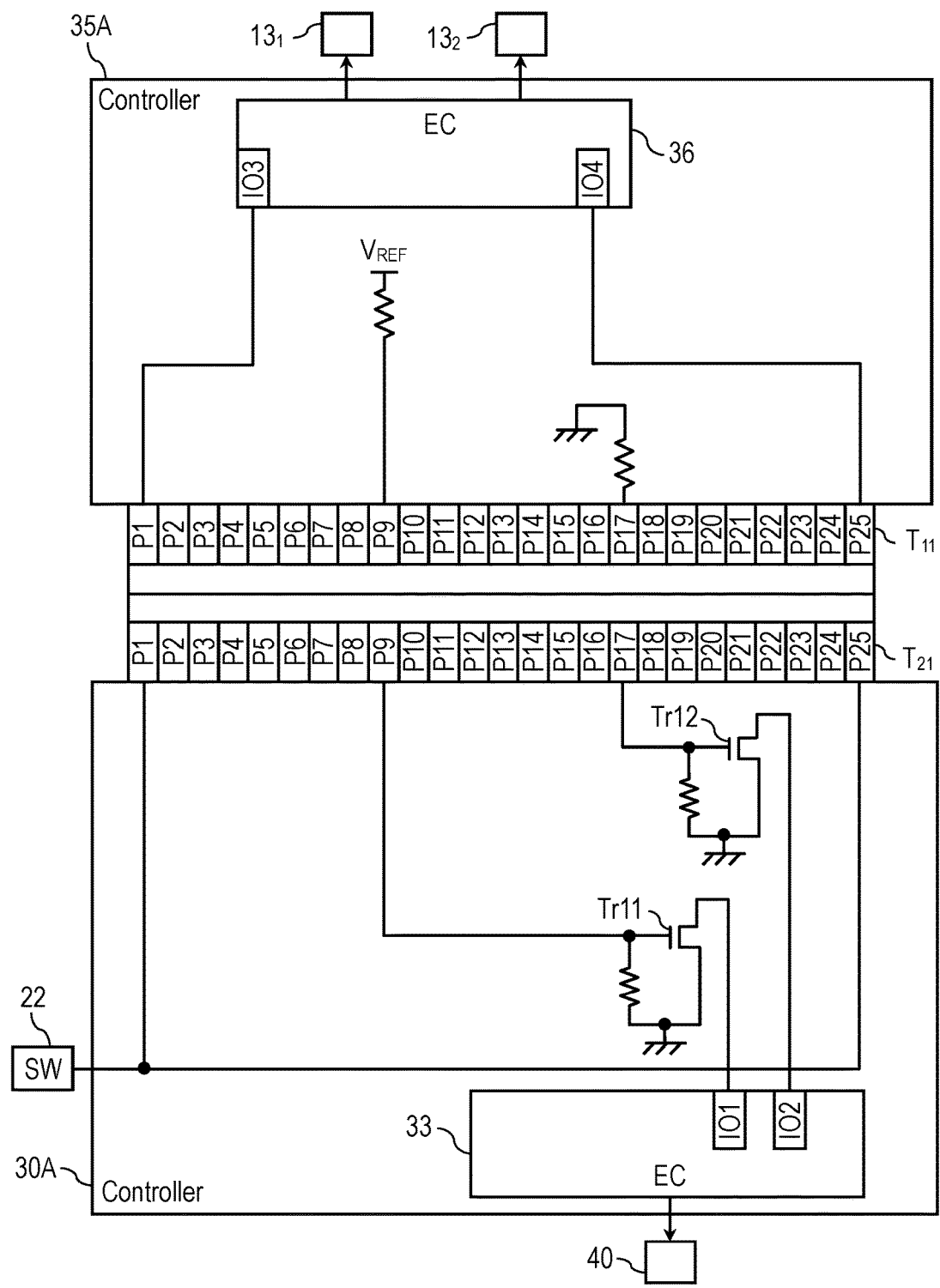
FIG. 11 is a view illustrating electrical couplings between controllers 30A, 35A in the first mounting state.
Figure 12:
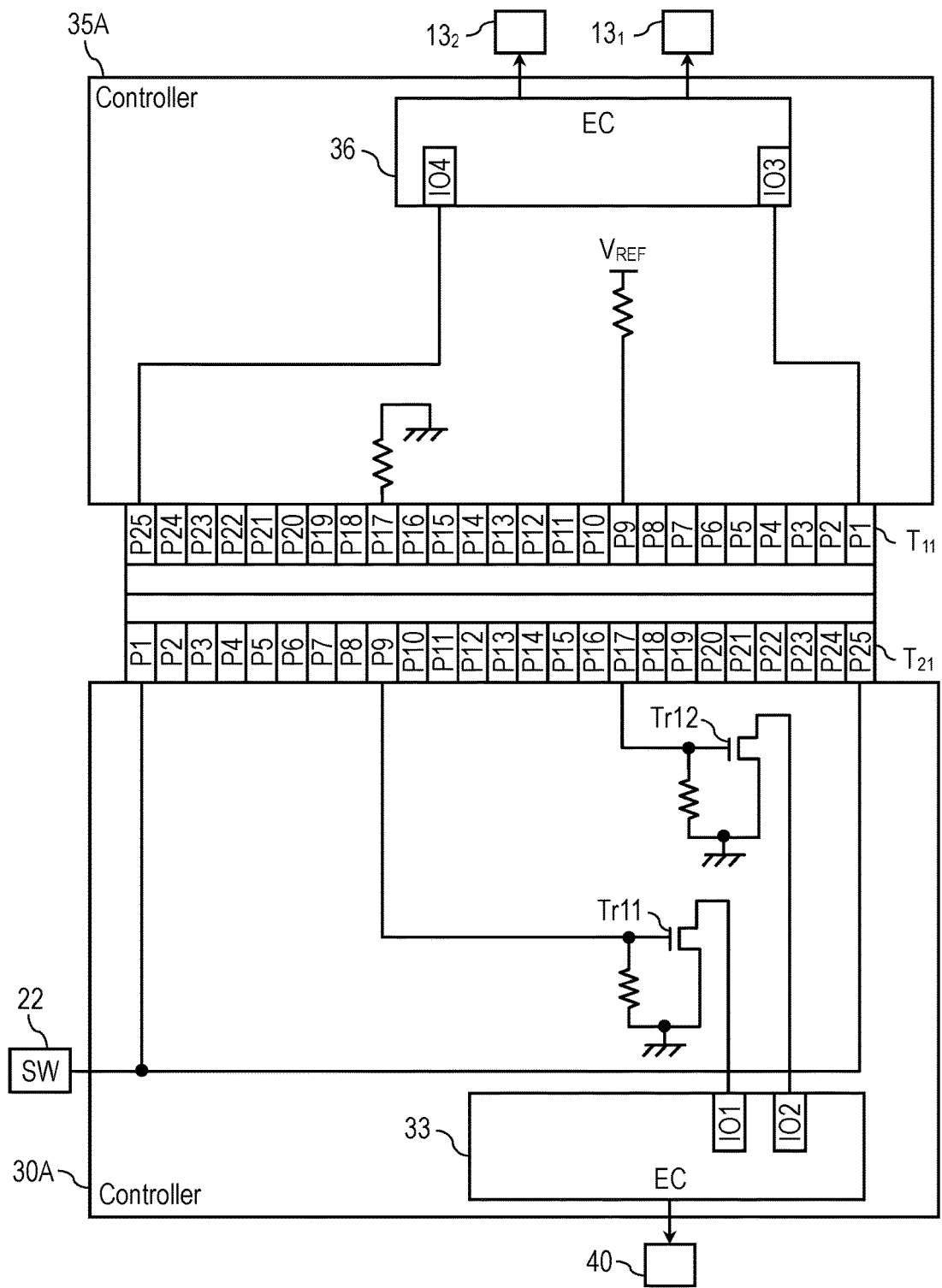
FIG. 12 is a view illustrating electrical couplings between controllers 30A, 35A in the second mounting state.

How controllers 30A, 35A and first and second control terminals $T_{11}$, $T_{21}$ detect the first and second mounting states of tablet PC 10A with respect to base 20A will now be described herein. FIG. 11 is a view illustrating electrical couplings between controllers 30A, 35A in the first mounting state. FIG. 12 is a view illustrating electrical couplings between controllers 30A, 35A in the second mounting state.

As shown in FIG. 11, in the first mounting state, pins P1 to P25 of first control terminal $T_{11}$ are respectively coupled to pins P1 to P25 of second control terminal $T_{21}$. On the other hand, as shown in FIG. 12, in the second mounting state, pins P1 to P25 of first control terminal $T_{11}$ are respectively coupled to pins P25 to P1 of second control terminal $T_{21}$.

In the first mounting state, as shown in FIG. 11, reference voltage $V_{REF}$ is input from controller 35A of tablet PC 10A, via pin P9, into the gate terminal of transistor Tr11, and thus transistor Tr11 is turned off. Therefore, pin IO1 of EC 33 is open. On the other hand, the gate terminal of transistor Tr12 is coupled to a ground potential via pin P17, and thus transistor Tr12 is turned on. Therefore, pin IO2 of EC 33 is at a "low" level. As described above, when pin IO1 is open, and pin IO2 is at the low level, EC 33 detects the first mounting state, and transmits to terminal switch 40 the terminal switch signal at the "high" level indicative of the first mounting state.

On the other hand, in the second coupling state, as shown in FIG. 12, the gate terminal of transistor Tr11 is coupled to a ground potential via pins P9 and P17, and thus transistor Tr11 is turned on. Therefore, pin IO1 of EC 33 is at a "low" level. On the other hand, reference voltage $V_{REF}$ is input from controller 35A of tablet PC 10A, via pins P17 and P9, into the gate terminal of transistor Tr12, and thus transistor Tr12 is turned off. Therefore, pin IO2 of EC 33 is open. As described above, when pin IO1 is at the low level, and pin IO2 is open, EC 33 detects the second mounting state, and transmits to terminal switch 40 the terminal switch signal at the "low" level indicative of the second mounting state.

First Mounting State

When tablet PC 10A is attached to a holder of base 20A in the first mounting state, as shown in FIG. 9, first antenna terminal $T_1$ of tablet PC 10A is coupled to third antenna terminal $T_3$ of base 20A, and second antenna terminal $T_2$ is coupled to fourth antenna terminal $T_4$ of base 20A. At this time, as shown in FIG. 11, pins P1 to P25 of first control terminal $T_{11}$ are respectively coupled to pins P1 to P25 of second control terminal $T_{21}$.

At this time, as shown in FIG. 11, a potential at the gate terminal of transistor Tr12 of controller 30A reaches the ground potential, transistor Tr12 is turned on, and pin IO2 of EC 33 is at "low." Simultaneously, reference voltage $V_{REF}$ is input into the gate terminal of transistor Tr11, transistor Tr11 is turned off, and pin IO1 of EC 33 is open. Based on the states of pins IO1, IO2 as described above, EC 33 of controller 30A detects the first mounting state, and transmits to terminal switch 40 the terminal switch signal at the "high" level. Therefore, as shown in FIG. 9, terminal switch 40 is controlled such that third antenna terminal $T_3$ (i.e., first communication unit 11$_1$) is coupled to fifth antenna terminal $T_5$, and fourth antenna terminal $T_4$ (i.e., second communication unit 11$_2$) is coupled to sixth antenna terminal $T_6$.

Therefore, first communication unit 11$_1$ can use first external antenna 3$_1$ to perform communications, and second communication unit 11$_2$ can use second external antenna 3$_2$ to perform communications.

Second Mounting State

On the other hand, when tablet PC 10A is attached to the holder of base 20A in the second mounting state, as shown in FIG. 10, first antenna terminal $T_1$ of tablet PC 10A is coupled to fourth antenna terminal $T_4$ of base 20A, and second antenna terminal $T_2$ is coupled to third antenna terminal $T_3$ of base 20A. At this time, as shown in FIG. 12, pins P1 to P25 of first control terminal $T_{11}$ are respectively coupled to pins P25 to P1 of second control terminal $T_{21}$.

At this time, as shown in FIG. 12, a potential at the gate terminal of transistor Tr11 of controller 30A reaches the ground potential, transistor Tr11 is turned on, and pin IO1 of EC 33 is at the "low" level. Simultaneously, reference voltage $V_{REF}$ is input into the gate terminal of transistor Tr12 of controller 30A, transistor Tr12 is turned off, and pin IO2 of EC 33 is open. Based on the states of pins IO1, IO2 as described above, EC 33 of controller 30A detects the second coupling state, and transmits to terminal switch 40 the terminal switch signal at the "low" level. Therefore, as shown in FIG. 10, terminal switch 40 is controlled such that third antenna terminal $T_3$ (i.e., first communication unit 11$_1$) is coupled to sixth antenna terminal $T_6$, and fourth antenna terminal $T_4$ (i.e., second communication unit 11$_2$) is coupled to fifth antenna terminal $T_5$.

Therefore, even in the second mounting state, similar to the first mounting state, first communication unit 11$_1$ can use first external antenna 3$_1$ to perform communications, and second communication unit 11$_2$ can use second external antenna 3$_2$ to perform communications.

As described above, also in this exemplary embodiment, even when tablet PC (radio communication device) 10A is mounted on base 20A in the second mounting state, and signals to be received by first antenna terminal $T_1$ and second antenna terminal $T_2$ are reversed, a relation between first communication unit 11$_1$ and the first signal and a relation between second communication unit 11$_2$ and the second signal are maintained, similar to the case when tablet PC 10A is mounted on base 20A in the first mounting state.

In other words, even when couplings of first and second antenna terminals $T_1$, $T_2$ to first and second external antennas 3$_1$, 3$_2$ are reversed, a coupling relation between first communication unit 11$_1$ and first external antenna 3$_1$ and a coupling relation between second communication unit 11$_2$ and second external antenna 3$_2$ are maintained.

Other Exemplary Embodiments

As above, the first and second exemplary embodiments have been described as illustration of the technique disclosed in the present application. However, the technique of the present disclosure is not limited to the first and second exemplary embodiments, but is applicable to another exemplary embodiment in which a change, a replacement, an addition, or an omission is appropriately made. A new exemplary embodiment can also be made by a combination of the components described in the first and second exemplary embodiments.

The exemplary embodiments have described, as first communication unit 11$_1$, a communication module for transmitting and receiving (or receiving only) configured to perform communications conforming to a communication system such as Bluetooth, Wi-Fi, third generation mobile communication system (3G), or Long Term Evolution (LTE), and, as second communication unit 11$_2$, a reception exclusive communication module configured to perform communications conforming to GPS, for example. However, the present disclosure is not limited to these communication modules. First and second communication units 11$_1$, 11$_2$ according to the present disclosure may be communication modules for transmitting and receiving (or receiving only) configured to perform communications conforming to one of communication systems including Global Positioning System (GPS), Bluetooth, Wi-Fi, 3G and LTE. In this case, first and second internal antennas 12$_1$, 12$_2$ and first and second external antennas 3$_1$, 3$_2$ may be transmission and reception antennas conforming to a communication system corresponding to a communication system to which first and second communication units 11$_1$, 11$_2$ conform. In such an exemplary embodiment, the idea of the present disclosure can be applied when a communication system to which first communication unit 11$_1$ conforms and a communication system to which second communication unit 11$_2$ conforms differ from each other.

Each of the exemplary embodiments has described a tablet PC including two communication units and two antenna terminals. However, the present disclosure is not limited to these components. The idea of the present disclosure can be applied to various devices including two communication units and two antenna terminals, in which signals to be received by the two antenna terminals are reversed.

The exemplary embodiments have been described above and exemplified as the technique of the present disclosure. The accompanying drawings and detailed description have been provided for this purpose. Accordingly, the components described in the appended drawings and the detailed description include, in order to exemplifying the above described technique, not only essential components, but also components that are not essential. Therefore, it should not be immediately construed that these components that are not essential are essential even if the components are described in the appended drawings and the detailed description. Since the above-described exemplary embodiments are for exemplifying the technique of the present disclosure, various modifications, replacements, additions, and omissions can be made within the scope of the appended claims or of their equivalents.

The present disclosure is applicable to radio communication devices capable of performing radio communications using external antennas.

What is claimed is:

1. A radio communication device, detachably mounted on a base, comprising:
   first and second communication units;
   a first antenna terminal used to receive one of first and second signals from the base;
   a second antenna terminal used to receive another one of the first and second signals from the base;
   a terminal switch configured to perform switching between a first coupling state in which the first communication unit and the first antenna terminal are coupled, and the second communication unit and the second antenna terminal are coupled, and a second coupling state in which the first communication unit and the second antenna terminal are coupled, and the second communication unit and the first antenna terminal are coupled; and
   a controller configured to control the terminal switch so as to switch to the first coupling state when in a first reception state in which the first antenna terminal receives the first signal from a third antenna terminal of the base, and the second antenna terminal receives the second signal from a fourth antenna terminal of the base, and to control the terminal switch so as to switch to the second coupling state when in a second reception state in which the first antenna terminal receives the second signal from the fourth antenna terminal of the base, and the second antenna terminal receives the first signal from the third antenna terminal of the base.

2. The radio communication device according to claim 1, wherein each of the first communication unit and the second communication unit is a communication module for transmitting and receiving or for receiving only, and a communication system to which the first communication unit conforms and a communication system to which the second communication unit conforms differ from each other.

3. The radio communication device according to claim 2, wherein each of the first communication unit and the second communication unit is the communication module conforming to one of communication systems of Global Positioning System (GPS), Bluetooth, Wi-Fi, third generation mobile communication system (3G), and Long-Term Evolution (LTE).

4. The radio communication device according to claim 1, wherein the first signal is a signal to be received by a first external antenna, and the second signal is a signal to be received by a second external antenna.

5. The radio communication device according to claim 1, further comprising:
   a first internal antenna;
   a second internal antenna;
   a first antenna switch configured to couple the first communication unit to the first internal antenna or the terminal switch; and
   a second antenna switch configured to couple the second communication unit to the second internal antenna or the terminal switch.

6. A radio communication system comprising:
   a radio communication device; and
   a base detachably connected to the radio communication device,
   the radio communication device including:
     first and second communication units;
     a first antenna terminal used to receive one of first and second signals;
     a second antenna terminal used to receive another one of the first and second signals;
     a terminal switch configured to perform switching between a first coupling state in which the first communication unit and the first antenna terminal are coupled, and the second communication unit and the second antenna terminal are coupled, and a second coupling state in which the first communication unit and the second antenna terminal are coupled, and the second communication unit and the first antenna terminal are coupled; and
     a controller configured to control the terminal switch so as to switch to the first coupling state when in a first reception state in which the first antenna terminal receives the first signal, and the second antenna terminal receives the second signal, and to control the terminal switch so as to switch to the second coupling state when in a second reception state in which the first antenna terminal receives the second signal, and the second antenna terminal receives the first signal;
   the base including:
     a third antenna terminal to be coupled to one of the first and second antenna terminals; and
     a fourth antenna terminal to be coupled to another one of the first and second antenna terminals,
   wherein when the radio communication device is mounted on the base in a first mounting state,
     the first antenna terminal is connected with the third antenna terminal,
     the second antenna terminal is connected with the fourth antenna terminal, and
     the controller controls the terminal switch so as to switch to the first coupling state,
   wherein when the radio communication device is mounted on the base in a second mounting state,
     the first antenna terminal is connected with the fourth antenna terminal,
     the second antenna terminal is connected with the third antenna terminal, and
     the controller controls the terminal switch so as to switch to the second coupling state.

7. The radio communication system according to claim 6, further comprising a detector configured to detect the first reception state and the second reception state.

8. A radio communication system comprising:
   a radio communication device; and
   a base mounted with the radio communication device,
   wherein the radio communication device includes first and second communication units,
a first antenna terminal coupled to the first communication unit, and
a second antenna terminal coupled to the second communication unit, and wherein the base includes
a third antenna terminal to be coupled to one of the first and second antenna terminals,
a fourth antenna terminal to be coupled to another one of the first and second antenna terminals,
a fifth antenna terminal used to receive a first signal,
a sixth antenna terminal used to receive a second signal,
a terminal switch configured to perform switching between a first coupling state in which the third antenna terminal and the fifth antenna terminal are coupled, and the fourth antenna terminal and the sixth antenna terminal are coupled, and a second coupling state in which the third antenna terminal and the sixth antenna terminal are coupled, and the fourth antenna terminal and the fifth antenna terminal are coupled, and
a controller configured to control the terminal switch, and wherein the controller controls the terminal switch so as to switch to the first coupling state when the radio communication device is mounted on the base such that the first antenna terminal and the third antenna terminal are coupled, and the second antenna terminal and the fourth antenna terminal are coupled, and so as to switch to the second coupling state when the radio communication device is mounted on the base such that the first antenna terminal and the fourth antenna terminal are coupled, and the second antenna terminal and the third antenna terminal are coupled.

\* \* \* \* \*